4 Sheets—Sheet 1.

H. E. PRIDMORE.

Assignor to McCormick Harvesting Machine Company.

HARVESTER.

No. 10,516. Reissued Aug. 26, 1884.

WITNESSES

Wm. A. Skinkle

Henry A. Lamb

INVENTOR

Henry E. Pridmore

By his Attorneys

Pancoast & Pancoast

N. PETERS, Photo-Lithographer, Washington, D. C.

4 Sheets—Sheet 2.

H. E. PRIDMORE.

Assignor to McCORMICK HARVESTING MACHINE COMPANY.

HARVESTER.

No. 10,516. Reissued Aug. 26, 1884.

WITNESSES

Wm A. Skinkle

Henry A. Lamb

INVENTOR

Henry E. Pridmore

By his Attorneys

Dancison & Dancison

N. PETERS. Photo-Lithographer, Washington, D. C.

4 Sheets—Sheet 3.

H. E. PRIDMORE.

Assignor to McCORMICK HARVESTING MACHINE COMPANY.

HARVESTER.

No. 10,516. Reissued Aug. 26, 1884.

WITNESSES

Wm A. Skinkle

Henry A. Lamb

INVENTOR

Henry E. Pridmore

By his Attorneys,

Parkinson & Parkinson

N. PETERS, Photo-Lithographer, Washington, D. C.

4 Sheets—Sheet 4.

H. E. PRIDMORE.

Assignor to McCORMICK HARVESTING MACHINE COMPANY.

HARVESTER.

No. 10,516. Reissued Aug. 26, 1884.

WITNESSES

Wm A. Skinkle

Henry A. Lamb

INVENTOR

Henry E. Pridmore

By his Attorneys

Parkinson & Parkinson

N. PETERS, Photo-Lithographer, Washington, D. C.

UNITED STATES PATENT OFFICE.

HENRY E. PRIDMORE, OF CHICAGO, ILLINOIS, ASSIGNOR TO McCORMICK HARVESTING MACHINE COMPANY, OF SAME PLACE.

HARVESTER.

SPECIFICATION forming part of Reissued Letters Patent No. 10,516, dated August 26, 1884.

Original No. 270,120, dated January 2, 1883. Application for reissue filed May 1, 1883.

DIVISION B.

*To all whom it may concern:*

Be it known that I, HENRY E. PRIDMORE, of Chicago, in the county of Cook and State of Illinois, have invented certain new and useful Improvements in Harvesters, of which the following is a specification.

The invention relates to that type of harvesters commonly termed "one-wheel"—that is, having at the inner or stubble end a main or driving wheel, and at the opposite or outer end a grain wheel or caster, with a platform, usually segmental, but sometimes rectangular, supported between the two, and a sweep or other rake to clear the gavels therefrom; and it consists in combining with a hinged tongue a seat with support and foot-rest sleeved to the outer or stubble end of the main axle, a brace rigid with said support and extending therefrom to the tongue, and a pendulum-keeper upon the tongue, in which the end of said brace plays.

Figure 1:
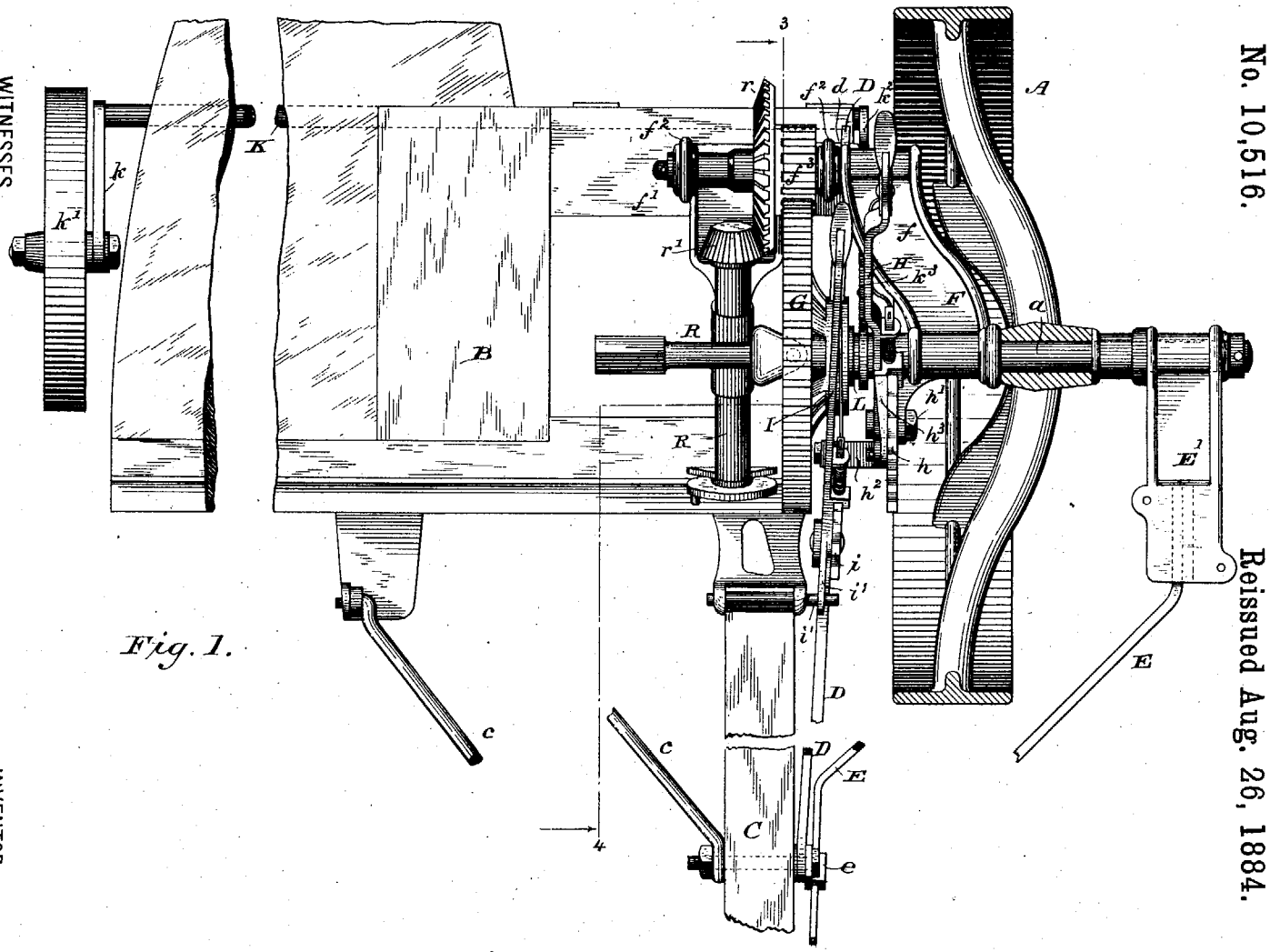
Figure 2:
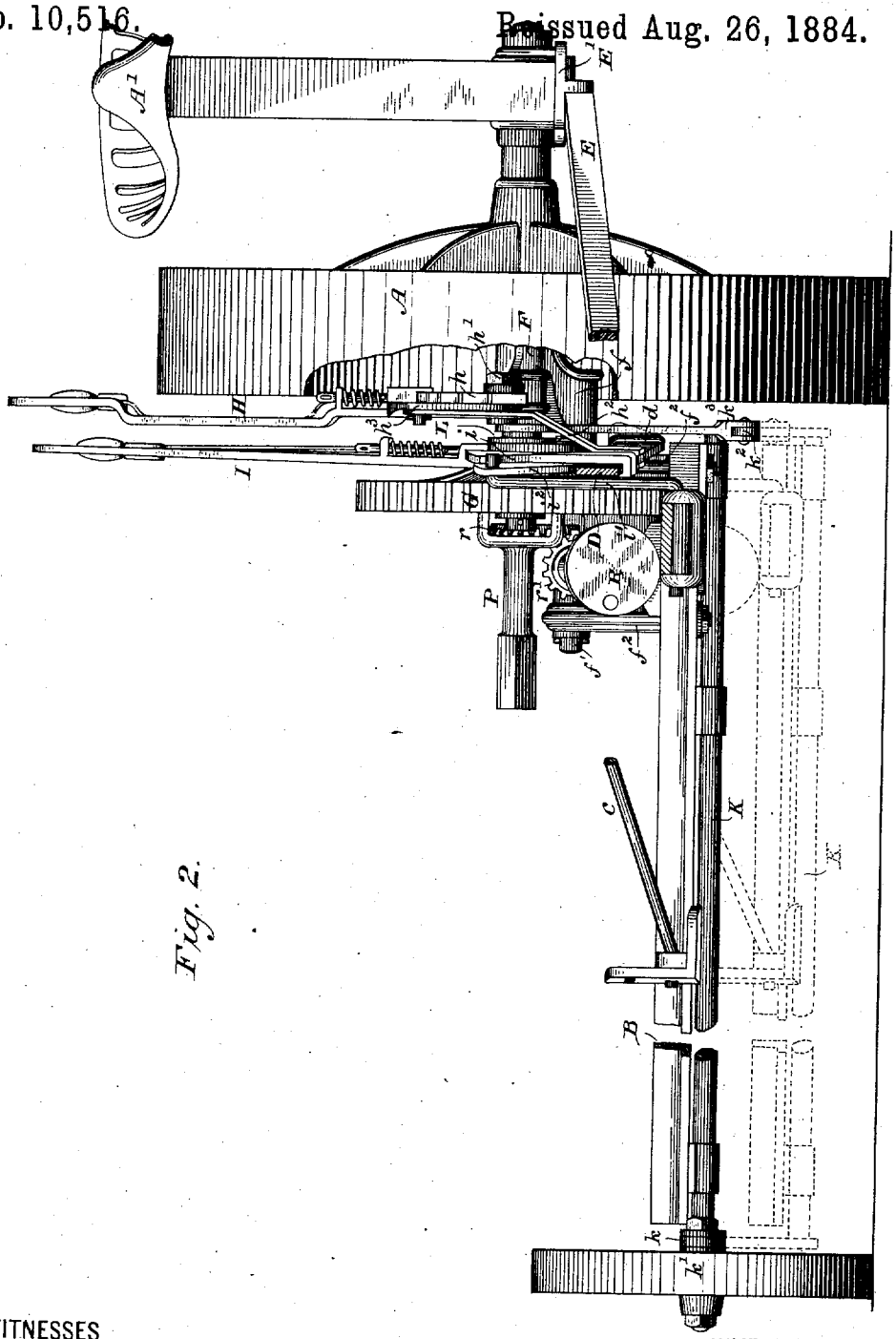
Figure 3:
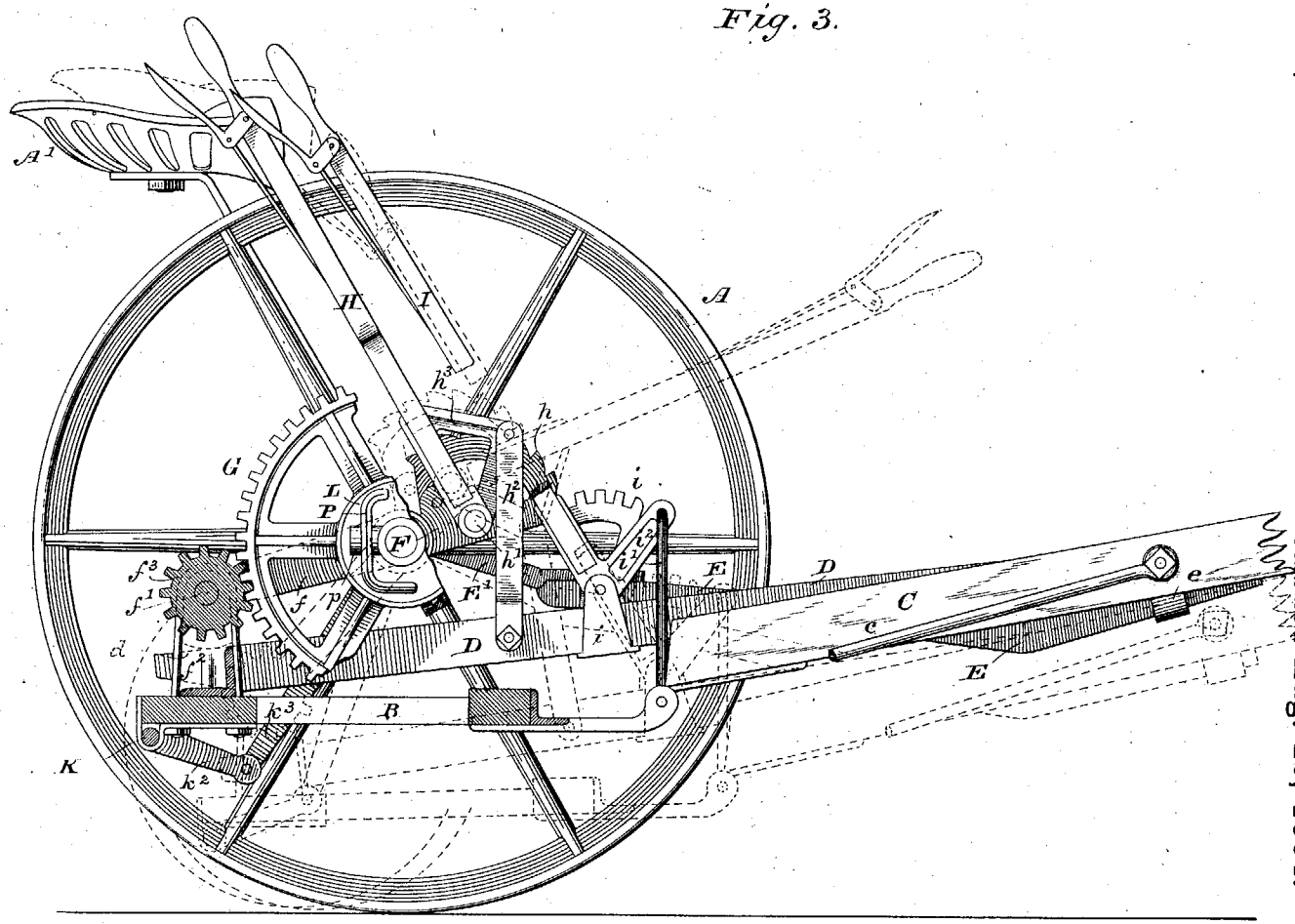
Figure 4:
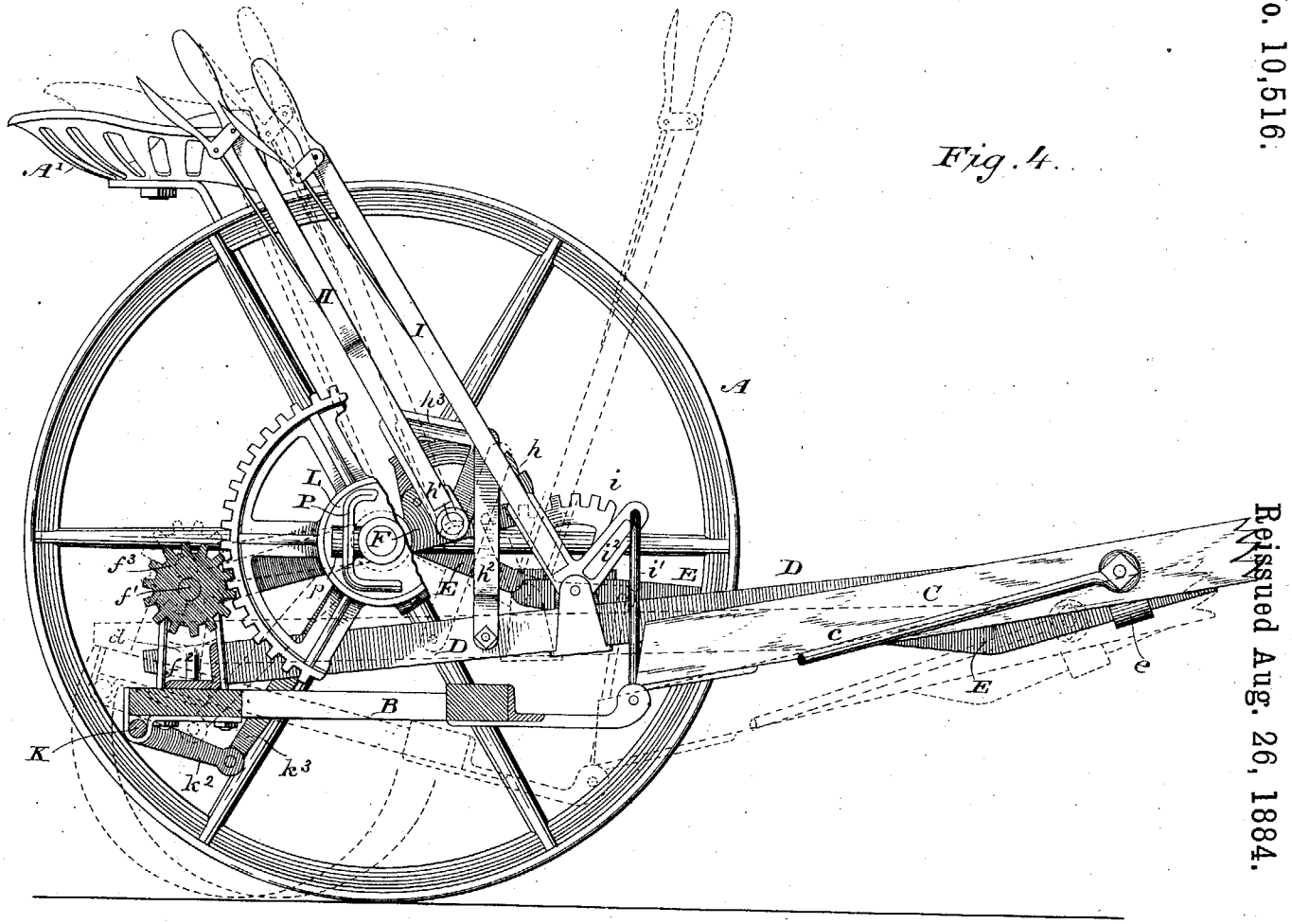

In the drawings, Figure 1 is a top plan view of a harvester embodying my invention, with the main wheel in section. Fig. 2 is a front elevation thereof. Fig. 3 is a side elevation from the grain end, with the platform in section and the vertical adjustment of the latter indicated in dotted lines; and Fig. 4 is a like side elevation to illustrate the tipping adjustment.

A is the main wheel, for the purpose of the present gearing keyed fast to its axle *a*, but, if demanded by the nature of other gearing substituted therefor on the machine, allowed to turn loosely on said axle; and A′ is the seat supported outside or on the stubble side of said wheel upon a standard rising from a bracket or casting sleeved upon the axle.

B is the platform, of any suitable shape required by the action of the raking mechanism or by the nature of the harvester. To the front of this platform is hinged the rear end of the draft-tongue C, connected also by a hound, *c*, with the inside shoe or divider. Pivoted to this draft-tongue, either by the same bolt securing the front end of the hound or at another suitable point, is a strong bar, D, hereinafter called the "supporting-bar" or "frame-bar," which runs back to the rear inner corner of the platform, or thereabout, and is there confined by a keeper, *d*, in which it is allowed to play longitudinally, and to compensate for the tipping of the platform it has its under surface at this end beveled. Another bar or brace, E, rigid with the seat-support and foot-rest E′, sleeved to the stubble end of the axle, is brought to the tongue at the pivotal point of the frame-bar; and is there confined, with capacity of longitudinal play, in a keeper, *e*, also preferably secured by the pivot-bolt of the hound and having a pendulum movement, so as to support the seat in its proper position during the vertical and tipping adjustments of the platform.

A bracket-casting, F, is sleeved to the axle inside the main wheel and provided with a rearwardly-extending arm, *f*, secured to the prime-pinion shaft $f'$, supported in standards $f^2$ at the rear inner corner of the platform, above or adjacent to the keeper for the frame-bar, said arm thus serving as a radius-bar to keep the prime pinion $f^3$ in mesh with the main gear G, mounted upon the axle outside of the bracket-casting. In front of the axle the casting is vertically flattened and enlarged to form a segment-rack, *h*, with its teeth preferably set ratchet-wise, for the raising, lowering, and supporting lever H, which lever is pivoted to the casting at $h'$, concentric with said rack, and by means of a link, $h^2$, depending from its crank-arm or offset $h^3$, is connected with the frame-bar at a point over the front part of the platform, thus serving to support said frame-bar from the axle, and through it the rear end of the platform. A second lever, I, is pivoted to a segment-casting, *i*, bolted to the frame-bar a little to the rear of the tongue-joint, and by means of a link, $i'$, connecting its arm, $i^2$, with said joint or with the platform, serves to raise and lower the front of the platform, or to hold it in fixed relation to the frame-bar. Both levers are provided with hand-pieces and links controlling latches which take into the racks upon their respective segments and hold them in any given adjustment. It will be understood that instead of these link-connections between the lever-arms and the bodies which they support, chains or other suitable instrumentalities may be employed. The links, however, are preferable in this, that they hold said bodies rigidly to their work and prevent wabbling or jumping.

Journaled in hangers beneath the platform is a shaft, K, parallel with the finger-bar, but set sufficiently back therefrom, according to the depth of the platform, to serve its purpose. At the grain end this shaft has a crank or arm, $k$, forming a support for the grain-wheel, $k'$, or caster, and at its inner end, near the main wheel, another arm, $k^2$, at a slight angle to the former, for more effective leverage, but extending in the same direction—that is, forward—and directly connected by a link, $k^3$, with the main axle, said link being sleeved to the axle so as to swing thereabout, the second arm, however, being somewhat shorter than the grain-wheel support, so that, as the platform is raised and lowered in reference to the axis of the main wheel, the relative movement of the grain-wheel, controlled by the link from said axis, shall keep pace with that of the main wheel, and the grain end of the platform shall rise and fall parallel with the stubble end.

Now, supposing the tipping-lever I to be set at any given adjustment, the front end of the platform will be held in fixed relation to the frame-bar immediately above, and if the raising and lowering lever H is manipulated in the appropriate direction this frame-bar will lift the platform concurrently in front and rear, preserving its fore-and-aft parallelism. Meanwhile, as the main wheel must relatively sink, it will operate the rock-shaft through its link-connection with the inner arm thereof, and will move the grain-wheel down a corresponding distance, so as to preserve the endwise parallelism of the platform to its original position; but supposing that it is desired to tip the platform upon a given vertical adjustment, the raising and lowering lever H will remain untouched, supporting the frame-bar, the rear of the platform, and the tipping-lever I at their fixed height, and the latter lever will be moved upon its pivot, so as to raise the platform or to lower it, as may be desired. Either of these adjusting movements will cause a flexion of the draft-tongue upon its pivots, which will be compensated for by the play of the frame-bar in its keeper, and as to the seat by the play of the arm therefrom in the pendulum-guide upon the tongue, while, as before intimated, the prime pinion will be kept in mesh by the action of the radius-arm from the bracket sleeved upon the main axle and supporting the raising and lowering lever.

It is evident that the frame-bar, instead of being pivoted to the draft-tongue at the front end and playing in a keeper on the platform at the rear end, can, with the same effect, be pivoted to the platform or a bracket therefrom at the rear end and play in a keeper on the draft-tongue at the front end.

It is also evident that the bevel on the rear end of the frame-bar can be omitted and some other compensatory device adopted, as a slot in the platform or a raised keeper having rollers between which the bar plays.

The main gear may be fixed to the main wheel, as in many harvesters now in use, in which case the latter wheel may run loose upon the axle; but, as already stated, I prefer that it shall be keyed fast to said axle, and mount the main gear G loosely on the axle, connecting it therewith by a backing-ratchet, L, so that it shall be driven in one direction only. This backing-ratchet will be so constructed as to be thrown entirely out of action for transporting the machine. Suitable means to this end are described in Division A of this reissue application, and also in Letters Patent No. 272,152, granted on the 13th day of February, 1883, to the McCormick Harvesting Machine Company as my assignee, and it is unnecessary to the purpose of the present case that they should be further described herein.

Upon the outer face of the gear-wheel are lugs $p$, to which is bolted the swiveling member or gimbal of a telescoping tumbling-shaft, P, driving the rake located at the inner front corner of the platform. The prime-pinion shaft mounted, as above mentioned, in bearings on the rear of the platform, with its pinion meshing with said gear and kept in engagement therewith by the radius-arm of the bracket-casting on the main axle, carries immediately beyond the pinion and integral with it a beveled gear-wheel, $r$, which drives a beveled pinion, $r'$, fast to the end of the crank-shaft R, running transversely along the inner end of the platform and beneath the tumbling-shaft until its wrist-pin is brought in proper relation to the heel of the cutter-bar. Thus the main gear driven immediately from the main axle in the forward movement of the machine drives the rake by direct tumbling-shaft connection and the cutter crank-shaft by means of the prime pinion and single set of bevel-gears, and, on the other hand, when from any reason thrown out of action with said axle, causes both rake and cutter-bar to stand at rest.

To economize space and bring the platform close to the inner edge of the main wheel the latter is made flaring or dishing inwardly, and the bracket with its radius-arm suitably bent and formed to coincide with said dish shape, thus enabling the end of the prime-pinion shaft to be set close to or within the main-wheel rim. The main gear-wheel is also dished and the ears for the attachment of the tumbling-shaft formed upon the dished face close to the axle or supporting-shaft.

I claim as my invention—

The combination of the seat, its support and foot-rest sleeved to the outer or stubble end of the main axle, the hinged tongue, the brace rigid with said support and extending therefrom to the tongue, and a pendulum-keeper upon the tongue, in which the end of said brace plays.

HENRY E. PRIDMORE.

Witnesses:
LADISLAS DE BÁNÓ,
JOHN V. A. HASBROOK.